United States Patent
Shi

(10) Patent No.: US 7,455,437 B2
(45) Date of Patent: Nov. 25, 2008

(54) AUTOMOBILE DOOR HANDLE WITH INDICATOR LIGHTS

(76) Inventor: Li-Hua Shi, No. 40, Lane 85, Anchang St, Annan District, Tainan City 709 (TW)

( * ) Notice: Subject to any disclaimer, the term of this patent is extended or adjusted under 35 U.S.C. 154(b) by 252 days.

(21) Appl. No.: 11/382,316

(22) Filed: May 9, 2006

(65) Prior Publication Data
US 2007/0263401 A1 Nov. 15, 2007

(51) Int. Cl.
*B60Q 1/32* (2006.01)
*B60J 5/04* (2006.01)

(52) U.S. Cl. ............... 362/501; 362/540; 296/1.02
(58) Field of Classification Search ............ 362/501, 362/540, 545; 296/1.02, 152, 146.6
See application file for complete search history.

(56) References Cited

U.S. PATENT DOCUMENTS 7,104,675 B2 * 9/2006 Chen ............... 362/490
7,244,054 B2 * 7/2007 Chou ............... 362/501
2006/0176710 A1 * 8/2006 Meinke et al. ....... 362/503
2007/0258258 A1 * 11/2007 Wang ............... 362/501

* cited by examiner

*Primary Examiner*—Stephen F Husar
*Assistant Examiner*—Peggy Neils
(74) *Attorney, Agent, or Firm*—Alan Kamrath; Kamrath & Associates PA

(57) ABSTRACT

An automobile door handle with indicator lights, has a recess for firmly receiving a circuit board having a plurality of light emitting members spaced apart lengthwise on the surface, an opening through the bottom of the recess for allowing conducting wires to pass therethrough, and an adjacent outer peripheral groove. A transparent cover is dimensioned and shaped to fit snugly over the outer peripheral groove and has more than one spaced projection protruded from one surface adapted to be abutted against the circuit board for fastening. Adhesive is applied to the conducting wires in the opening, a joining portion of the outer peripheral groove and the cover so as to provide the assembled door handle with indictor lights with waterproof and electricity leakage prevention characteristics.

2 Claims, 4 Drawing Sheets

AUTOMOBILE DOOR HANDLE WITH INDICATOR LIGHTS

BACKGROUND OF THE INVENTION

1. Field of Invention

The present invention relates to an automobile door handle and more particularly to an automobile door handle having a plurality of additional indicator lights.

2. Related Art

Conventionally, there is a type of automobile having a plurality of additional indicator lights each mounted on its door handle. Thus, the indicator lights may flash when headlights are lit or a left or right turn signal is applied.

However, the prior indicator light suffered from several disadvantages. For example, the number of its components is excessively large. Thus, its manufacturing cost is very high. Further, its assembly consumes a lot of time and is very complicated. Furthermore, it is trouble-prone and unreliable in use. Thus, the need for improvement still exists.

SUMMARY OF THE INVENTION

It is therefore an object of the present invention to provide an automobile door handle indicator lights assembly. The handle comprises an elongated recess and an outer peripheral groove. Within the recess, there is provided an opening through its bottom at one end so that a circuit board having a plurality of light emitting members is disposed in the recess and conducting wires extending from one end of the circuit board pass through the opening to physically and electrically connect to the electric system of the automobile. A cover, made of a transparent plate, is dimensioned and shaped to fit snugly over the outer peripheral groove and comprises more than one spaced projection protruded from one surface to be abutted against the circuit board for fastening. Adhesive is then applied to the conducting wires in the opening, a joining portion of the outer peripheral groove and the cover so that the assembled door handle with indicator lights has waterproof and electricity leakage prevention characteristics. Thus, an easier assembly of a door handle with indicator lights is achieved.

The above and other objects, features and advantages of the present invention will become apparent from the following detailed description taken with the accompanying drawings.

DETAILED DESCRIPTION OF THE INVENTION

Figure 1:
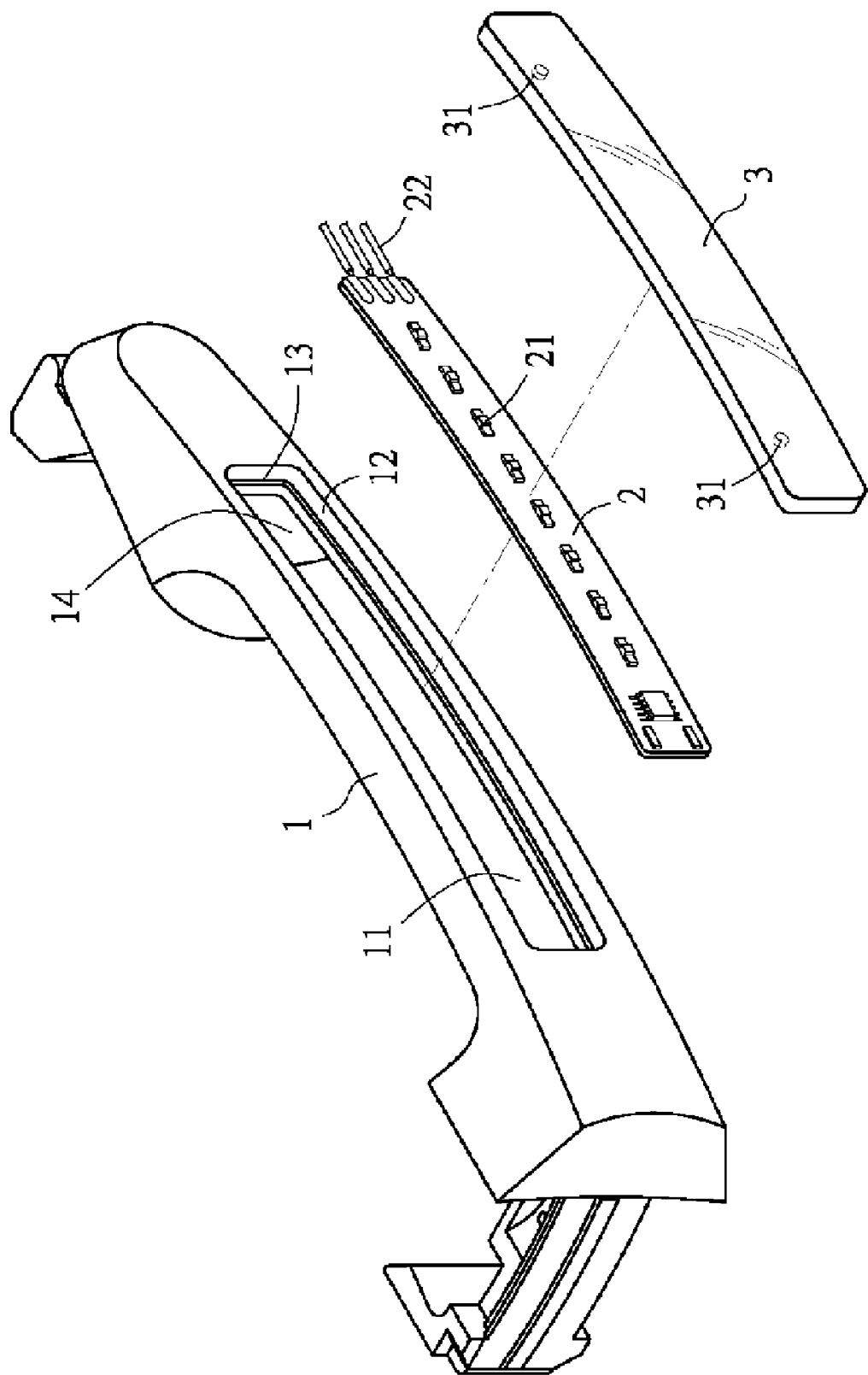
FIG. 1 is an exploded perspective view of an automobile door handle incorporating a preferred embodiment of indicator lights according to the invention.

Referring to FIG. 1, an automobile door handle 1 with indicator lights 5 in accordance with a preferred embodiment of the invention comprising the door handle 1, a circuit board 2 and a cover 3 is shown. The automobile door handle with indicator lights has simple components and can be easily assembled.

The handle 1 comprises an elongated recess 11 and an outer peripheral groove 12. Within the recess 11 there are provided an opening 14 through its bottom at one end. An inner peripheral edge 13 is formed between the recess 11 and the outer peripheral groove 12.

The circuit board 2 has a plurality of light emitting members 21 spaced apart lengthwise on the surface and a plurality of conducting wires 22 extending from one end. The circuit board 2 is dimensioned and shaped to fit snugly onto the bottom of the recess 11. The conducting wires 22 are adapted to be physically and electrically interconnected with the light emitting members 21 and an electric system (i.e., light source) of the automobile.

The cover 3, made of a transparent plate, is dimensioned and shaped to fit snugly over the outer peripheral groove 12 and comprises more than one spaced projection 31 protruded from one surface.

Figure 2:
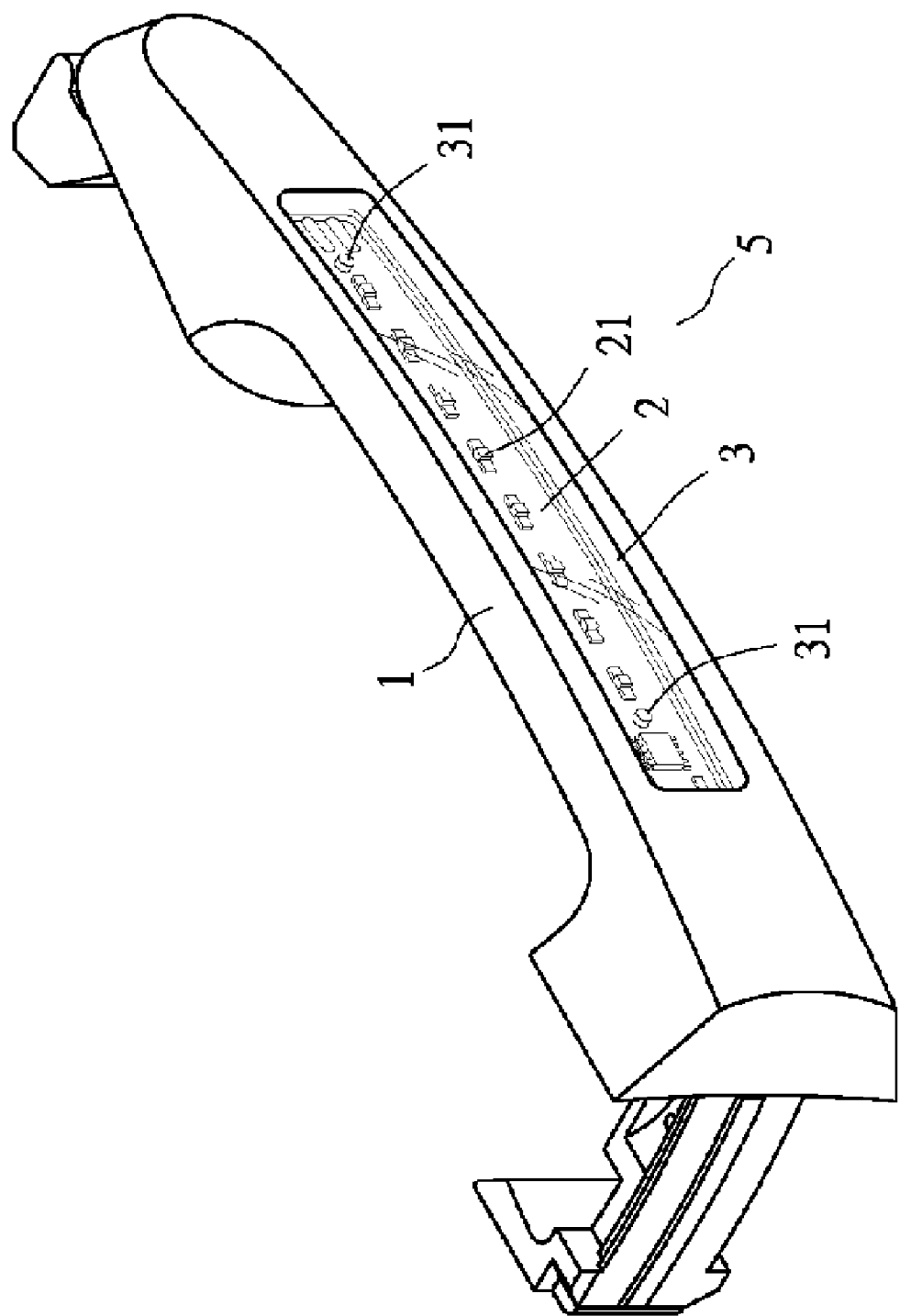
FIG. 2 is a perspective view of the assembled automobile door handle.
Figure 3:
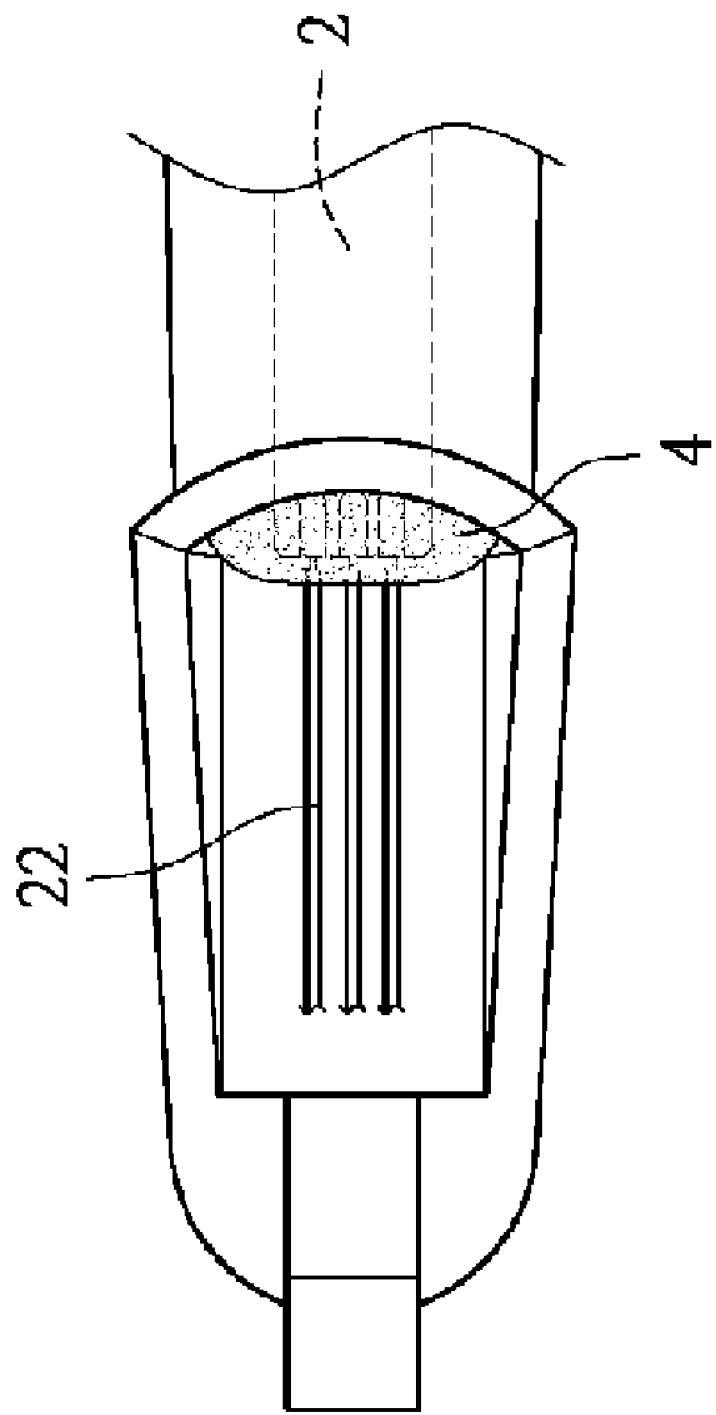
FIG. 3 is a schematic side elevation of the door handle of FIG. 2.

In assembly, referring to FIGS. 2 and 3, the circuit board 2 is disposed in the recess 11 and the conducting wires 22 pass through the opening 14 to physically and electrically connect to the electric system of the automobile, as shown in FIG. 3. The cover 3 is then disposed in the outer peripheral groove 12 with the projections 31 being abutted against the circuit board 2 for fastening. In addition, adhesive 4 is applied to the conducting wires 22 in the opening 14, a joining portion of the outer peripheral groove 12 and the cover 3. Once the adhesive 4 is cured, the above components are fastened. Therefore, the assembled door handle 1 with indicator lights 5 has waterproof and electricity leakage prevention characteristics.

Figure 4:
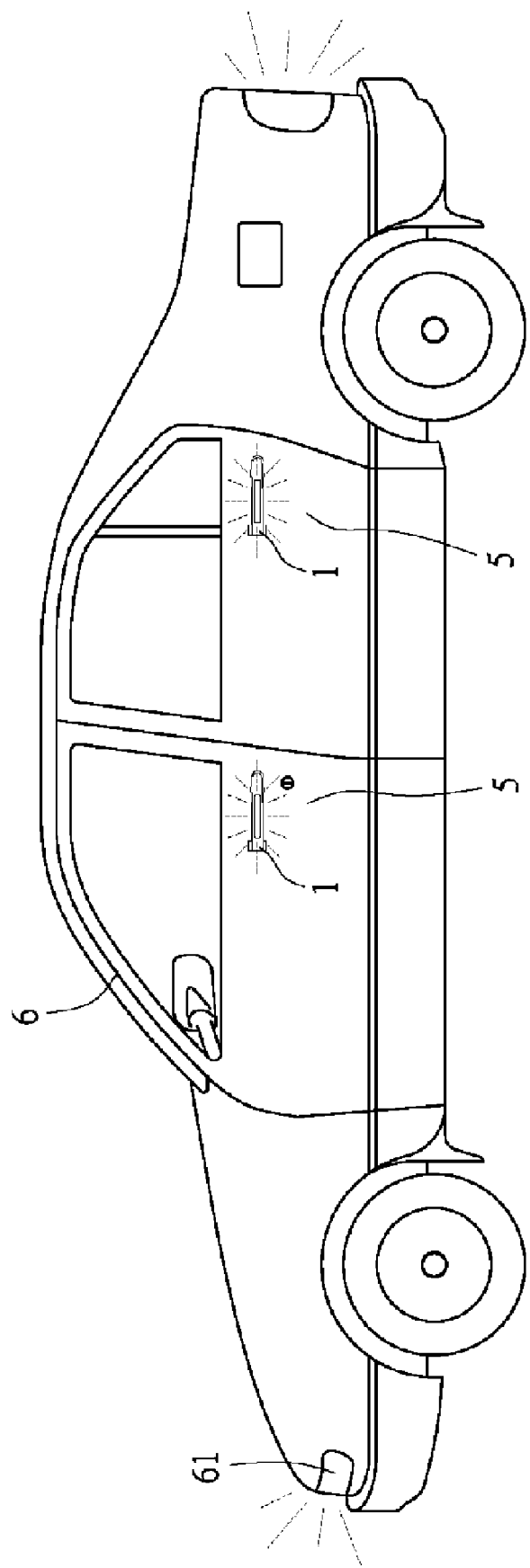
FIG. 4 is a side elevation of an automobile showing the indicator lights being flashed when both headlights and rear lights of an automobile are lit.

In use, referring to FIG. 4, the indicator lights 5 mounted on the door handles 1 will be activated when (i) headlights 61 of an automobile 6 are lit in the night or when visibility is low, (ii) the automobile 6 is braking, or (iii) a left or right turn signal is applied.

While the invention herein disclosed has been described by means of specific embodiments, numerous modifications and variations could be made thereto by those skilled in the art without departing from the scope and spirit of the invention set forth in the claims.

What is claimed is:

1. An automobile door handle indicator lights assembly comprising a door handle having a recess, a circuit board having a plurality of light emitting members on a surface, and a cover; wherein:

an outer peripheral groove is provided adjacent the recess allowing the cover to be disposed in the recess, with the outer peripheral groove including an opening at one end, a plurality of conducting wires of the circuit board pass through the opening to physically and electrically connect to an electric system of the automobile, a plurality of spaced projections protrude from an inner surface of the cover to abut against the circuit board and without interconnection to the circuit board, and adhesive is applied to the conducting wires in the opening, a joining portion of the outer peripheral groove and the cover to provide the assembled door handle with indicator lights with waterproof and electricity leakage prevention characteristics.

2. The automobile door handle indicator lights assembly of claim 1 wherein the cover is completely disposed in the recess and does not extend beyond the recess over the door handle.

* * * * *